N., L. & H. NILSON.
TRANSMISSION GEARING.
APPLICATION FILED MAY 29, 1911.
1,050,988.
Patented Jan. 21, 1913.
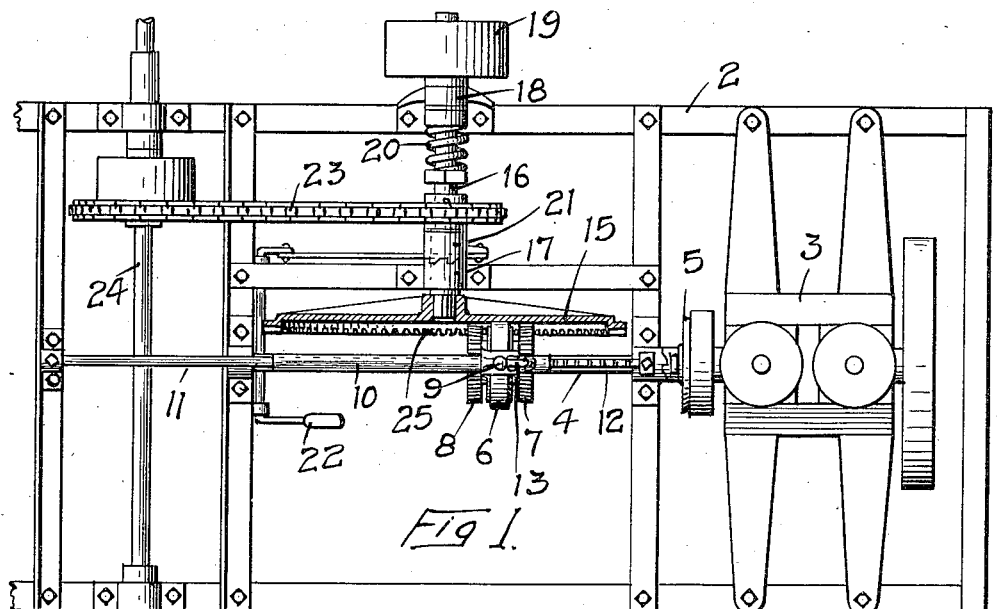
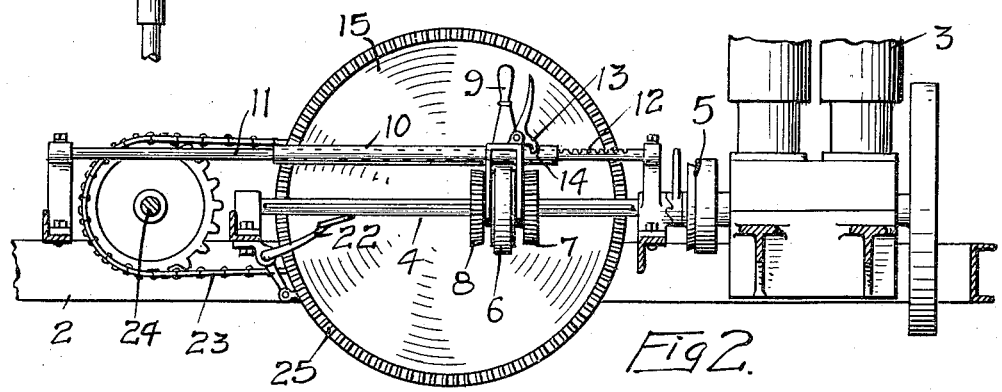
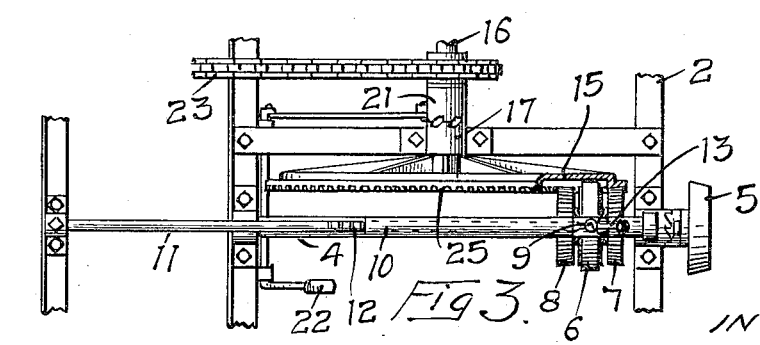
WITNESSES
INVENTORS
NILS NILSON
LEONARD NILSON
HAROLD NILSON
BY
ATTORNEYS

UNITED STATES PATENT OFFICE.

NILS NILSON, LEONARD NILSON, AND HAROLD NILSON, OF WAYZATA, MINNESOTA.

TRANSMISSION-GEARING.

1,050,988.

Specification of Letters Patent. Patented Jan. 21, 1913.

Application filed May 29, 1911. Serial No. 630,225.

*To all whom it may concern:*

Be it known that we, NILS NILSON, LEONARD NILSON, and HAROLD NILSON, of Wayzata, Hennepin county, Minnesota, have invented certain new and useful Improvements in Transmission-Gearing, of which the following is a specification.

The object of our invention is to provide a compact transmission gearing embodying a positive and a frictional drive. Generally in a friction disk driving mechanism as ordinarily constructed, a friction wheel is employed, sliding back and forth across the face of the disk and contacting with the surface thereof to transmit the power, the speed depending upon the position of the driving wheel with respect to the center of the disk. This form of driving mechanism is suitable for some purposes, but where the strain is variable it is sometimes desirable to have means for effecting a positive connection which will not slip under temporary increase in the load.

Our invention consists generally in a friction disk and a friction wheel therefor, said disk having circumferential teeth and pinions provided in connection with the friction wheel and adapted to engage said teeth.

In the accompanying drawings forming part of this specification, Figure 1 is a plan view, partially in section, showing the transmission mechanism embodying our invention, Fig. 2 is a longitudinal vertical sectional view of the same, Fig. 3 is a plan view, partially in section, showing the driving pinions in engagement with the teeth of the friction disk.

In the drawing, 2 represents a suitable frame and 3 a source of power, such as a gas engine, mounted thereon. 4 is a driving shaft in line with the shaft of the engine and connected therewith by a clutch device 5, by means of which the said shaft and engine can be operatively connected. A friction wheel 6 is splined on said driving shaft and gears 7 and 8 are also mounted on said shaft on each side of the wheel 6 and are slidable therewith lengthwise of said driving shaft. An operating handle 9 is provided for moving the friction wheel and gears back and forth on the shaft and this lever or handle preferably has a sleeve 10 that is slidable on a rod 11 that is arranged lengthwise of the shaft 4 and is provided with a series of teeth 12 which are engaged by a latch 13 operating through a slot 14 in said sleeve to engage the teeth 12 and lock the friction wheel and gears on said rod.

15 is a friction disk vertically arranged and having a horizontal shaft 16 that is slidable in bearings 17 and 18. A pulley 19 is mounted on said shaft and a spring 20 normally tends to move said shaft lengthwise and adjust the disk 15 into contact with the friction wheel 6. A shifting mechanism 21 is provided in connection with the shaft 16 operated by a treadle 22 and adapted to move said shaft and disk against the tension of the spring 20 and adjust the disk out of contact with the wheel 6 so that the revolution of said wheel will not operate to drive the disk. The pulley 19 may be belted to the work and a belt 23 connects the shaft 16 with the shaft 24 from which power may be transmitted to operate an agricultural implement or other mechanism. The disk 15 is provided with circumferential teeth 25 which mesh with one or the other of the gears 7 or 8 to transmit power from the driving shaft to the work. When one of these gears is in mesh the shifting mechanism 21 is operated, as indicated in Fig. 3, to move the disk 15 out of contact with the friction wheel 6. When the gear 7 is in mesh with the circumferential gear or teeth on one side of the center of the disk, the disk will be driven in one direction and when the gear 8 is in engagement with the teeth on the other side of the center, the disk will be operated in the opposite direction and, as usual, the direction of operation of the disk when the friction drive is used will be determined by the position of the wheel 6 with respect to the center of the disk. In this way we provide a positive driving mechanism for operating the disk in either direction and at the same time a frictional driving mechanism for variable speeds combined with a positive driving mechanism with the addition of a few parts and without to any appreciable extent increasing the space required for these parts.

We claim as our invention:—

1. A transmission gearing comprising a driving shaft operatively connected with a source of power, a friction wheel splined thereon, a gear also splined on said shaft, a friction disk having circumferential teeth, means for moving said disk toward or from said friction wheel and gear, said friction wheel being out of contact with said disk when said gear is in mesh with said teeth and said gear being out of contact with said disk when said wheel is in engagement therewith.

2. A transmission gearing comprising a friction disk having circumferential teeth, a sliding friction wheel, and a gear provided on each side of said wheel, and movable therewith, means for moving said disk toward or from said wheel and gears, said friction wheel being out of engagement with said disk when either one of said gears is in engagement with said teeth, and said gears being out of engagement with said teeth when said friction wheel is in contact with the surface of said disk.

3. A transmission gearing comprising a friction disk, a shaft whereon said disk is mounted, said shaft having driving connections and movable lengthwise in its bearings, a friction wheel and gears slidable across the face of said disk, said disk having circumferential teeth for said gears and said disk and friction wheel and gears being relatively movable toward and from one another, for the purpose specified.

4. A transmission gearing comprising a drive shaft, a source of power, a clutch operatively connecting said drive shaft with said source of power, a friction wheel and gears slidably mounted on said drive shaft, a friction disk having circumferential teeth adapted to mesh with the teeth of said gears, a shaft whereon said friction disk is mounted, means for moving said shaft lengthwise to adjust said disk in its active or inactive position, said friction wheel being adapted to contact with said disk when said gears are out of engagement with said teeth, and said wheel being out of engagement with said disk when either one of said gears is in mesh with said teeth.

5. A transmission gearing comprising a driving shaft, a friction wheel splined thereon, a gear also splined on said shaft, a friction disk having teeth thereon, means for moving said disk toward or from said friction wheel and gear, said gear and wheel alternating in their engagement respectively with said teeth and disk.

6. A transmission gearing comprising a driving shaft, a friction wheel splined thereon, a gear also splined on said shaft and of less diameter than said friction wheel, a friction disk having a surface adapted to engage said wheel and teeth to mesh with said gear, means for moving said friction disk toward or from said wheel and gear, said teeth projecting outwardly beyond the plane of said disk, for the purpose specified.

7. A transmission gearing comprising a friction disk, a shaft whereon said disk is mounted, said shaft having driving connections and movable lengthwise in its bearings, a friction wheel and a gear slidable across the face of said disk, said disk having teeth for said gear, a clutch device between said disk and shaft, a counter shaft, and a driving connection between said counter shaft and said first named shaft.

8. A transmission gearing comprising a friction disk, a shaft whereon said disk is mounted, a friction wheel and gear, a driving shaft whereon said friction wheel and gear are mounted, and slidable across the face of said disk, means for locking said wheel and gear on said driving shaft, said disk having a surface to contact with said wheel and teeth to mesh with said gear and said disk, and its shaft being movable toward and from said wheel and gear.

In witness whereof, we have hereunto set our hands this 24th day of May 1911.

NILS NILSON.
LEONARD NILSON.
HAROLD NILSON.

Witnesses:
GENEVIEVE E. SORENSEN,
EDWARD A. PAUL.